United States Patent [19]

Goins et al.

[11] Patent Number: 4,736,349

[45] Date of Patent: Apr. 5, 1988

[54] METHOD FOR ESTIMATING SHEAR WAVE REFLECTION DATA FROM ACQUIRED COMPRESSIONAL WAVE REFLECTION DATA

[75] Inventors: Neal R. Goins, Houston, Tex.; Ray S. Spratt, Lancaster, Calif.

[73] Assignee: Mobil Oil Corporation, New York, N.Y.

[21] Appl. No.: 41,964

[22] Filed: Apr. 24, 1987

[51] Int. Cl.$^4$ .............................................. G01V 1/36
[52] U.S. Cl. ...................................... 367/75; 367/47; 367/56
[58] Field of Search ...................... 367/47, 75, 56, 50, 367/74; 364/421

[56] References Cited

U.S. PATENT DOCUMENTS

| 4,316,267 | 2/1982 | Ostrander | 367/59 |
| 4,316,268 | 2/1982 | Ostrander | 367/59 |
| 4,534,019 | 8/1985 | Wiggins et al. | 364/421 |

Primary Examiner—Nelson Moskowitz
Assistant Examiner—Ian J. Lobo
Attorney, Agent, or Firm—Alexander J. McKillop; Michael G. Gilman; George W. Hager, Jr.

[57] ABSTRACT

A method is disclosed for obtaining shear wave data from common depth point gathered compressional wave traces using variations in the amplitude of the gathered compressional waves with source-receiver offset. The shear wave data can be used to generate pseudo-shear wave seismic sections.

2 Claims, 2 Drawing Sheets

METHOD FOR ESTIMATING SHEAR WAVE REFLECTION DATA FROM ACQUIRED COMPRESSIONAL WAVE REFLECTION DATA

BACKGROUND OF THE INVENTION

1. Field of the Invention

The present invention relates to a method for estimating shear wave reflection data from compressional wave reflection data and, more particularly, to a method for producing pseudo-shear wave reflection seismic sections from compressional wave reflection data.

2. Discussion of the Prior Art

The use of compressional (P) wave reflection data in geophysics analysis is notoriously well known. Typically, seismic sections are produced from compressional wave subsurface reflections which provide extremely useful information concerning formation characteristics. Recently, interest has been growing in obtaining shear (S) wave seismic sections which would provide additional useful information concerning subsurface formation characteristics which can be used in conjunction with information obtained from compressional wave seismic sections. For example, P wave seismic sections can provide useful information on the compressibility of subsurface formations, while S wave seismic sections can provide useful information on subsurface formation rigidity. However, the detection of shear wave reflections is more difficult than is the case with compressional wave reflections. The shear wave reflections are typically of lower amplitude than compressional wave reflections, making detection difficult, and the direct propogation of a shear wave into a subsurface formation to induce a shear wave reflection requires special transducers and additional steps over and above those required for obtaining compressional wave reflection data. This makes obtaining shear wave reflection data difficult, more costly and time consuming.

SUMMARY OF THE INVENTION

One object of the present invention is the provision of a method for estimating shear wave reflection data from acquired compressional wave reflection data, thus removing the requirement for a "shooting" or other special data acquisition procedures to obtain shear wave reflection data.

Another object of the invention is the provision of a method for producing pseudo shear wave seismic sections from acquired compressional wave reflection data.

The method of the invention analyzes variations in the amplitude of recorded compressional wave traces with sourcereceiver offset. Many variables affect the amplitude of the compressional wave signal with offset, including the presence of a shear wave at a reflection boundary. Each of the factors affecting amplitude is quantified and assigned a value, either estimated or measured, allowing the effects of shear wave reflection on the amplitude changes with offset to be estimated and recorded, thus producing shear wave reflection data. Seismic sections based on the estimated shear wave reflection data can then also be produced.

The above and other objects, advantages and features of the invention will be more readily understood from the following detailed description of the invention, which is provided in connection with the accompanying drawings.

DETAILED DESCRIPTION OF THE INVENTION

Figure 1:
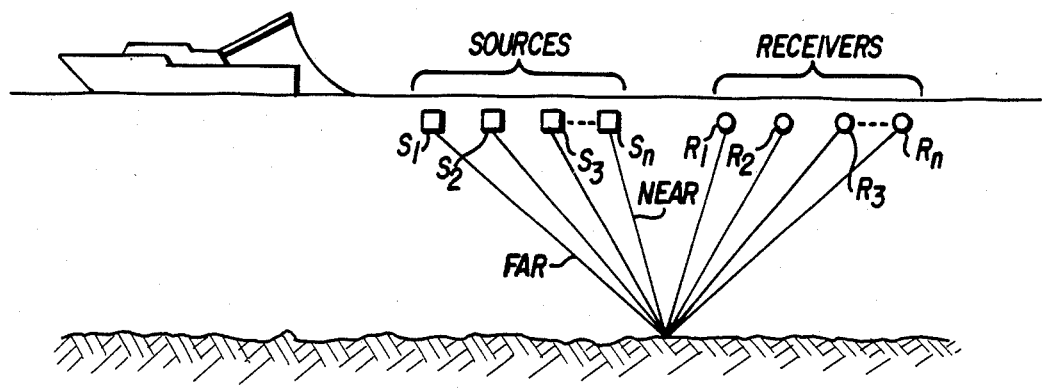
FIG. 1 illustrates a marine seismic exploration system employing an array of sources and receivers.

FIG. 1 illustrates source and receiver arrays which are typically used in marine seismic surveying. It should be understood that similar arrays are used for land seismic surveying and that the present invention is applicable to data gathered in both types of surveying. When land surveying is employed, however, an additional amplitude correction is used, as discussed below, which is not needed in a marine environment.

Figure 2:
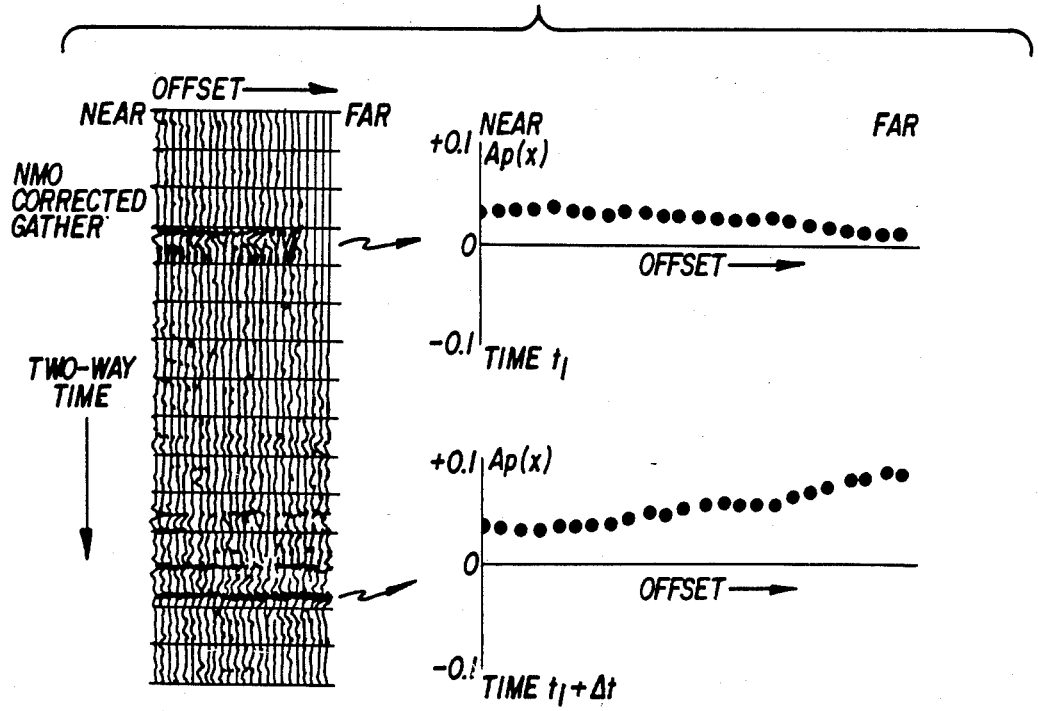
FIG. 2 illustrates a CDP gather of compressional reflection wave traces and graphs showing trace amplitude variations with offset.

During data gathering, the sources $S_1 \ldots S_n$ are activated, typically in sequence, to generate descending acoustic waves which partially reflect off subsurface boundary layers, producing ascending reflection signals (traces) which are received by receivers $R_1 \ldots R_n$ and recorded. During subsequent processing to produce seismic sections, the recorded signals are often gathered for common depth point (CDP) stacking. A typical common depth point gather is shown in FIG. 2 for near and far coupled pairs of sources and receivers, as well as for paired sources and receivers in between. The signals in this gather have been preprocessed by application of normal moveout (NMO) corrections in a known manner to the gathered signals. If land shooting is involved, the recorded signals in the FIG. 2 gather have also been preprocessed for surface consistent statics. Both NMO corrections and surface consistent statics corrections are well known in the art and a detailed discussion of these techniques is not repeated herein. Normally, the signal gather in FIG. 2 is then CDP stacked to enhance the signal-to-noise ratio of the reflection signals and the stacked traces may then be used to produce seismic sections of compressional reflection wave data.

The method of the invention uses variations in the amplitude of the CDP gathered compressional waves with offset, denoted herein as $A_p(x)$, at selected points in time, to estimate shear wave reflection data, which can in turn be used to produce pseudo-shear wave seismic sections corresponding to CDP stacked compressional wave seismic sections. As known in the art, offset refers to the distance between source receiver pairs used to generate a signal trace. The amplitude variation with offset $A_p(x)$ for the gathered traces at two selected points in time $t_1$, $t_1 + \Delta$ at is also shown in FIG. 2.

To understand the method of the invention, a brief discussion of the factors affecting amplitude variations with offset $A_p(x)$ is necessary. These are the P wave reflection coefficient $R_p$ (the coefficient of reflection of the compressional wave at a reflection interface), travel path factors (acoustic wave spreading and transmission characteristics), geometric characteristics of the source-receiver arrays and surface boundary conditions, and random variations such as transducer coupling (mainly for geophones in a land based shooting), and shallow attenuation. Of these factors, proper choice of shooting conditions can minimize the effects of some factors (except $R_p$) on the value $A_p(x)$. However, all of these factors, save $R_p$, cannot be completely removed and will be compensated for in processing steps of the invention, described in greater detail below. In the invention, the various factors affecting the value $A_p(x)$ are quantified so that the effects of changes in $A_p(x)$ due to shear wave reflections can be determined to provide information on the magnitude of the shear wave reflections.

The reflection coefficient $R_p$ is one of the important factors which must be determined in the method of the invention. The well know Zoeppritz equation relates the reflection coefficient $R_p$ to the variables $-\rho$, $V_p$, $V_s$, $-\rho$, $V_p'$, $V_s'$, where $-\rho$, $V_p$ and $V_s$ are the density, compressional wave velocity and shear wave velocity in the upper medium at a formation interface and $-\rho'$, and $V_p'$ and $V_s'$ are the density, compressional wave velocity and shear wave velocity in the lower medium at the interface.

Certain assumptions can be made concerning the relationships of these factors in the Zoeppritz equation. First, the fractional velocity/density changes across a reflection boundary are small and second, that the incident angles $\theta$ a between source and receiver pairs are small. Typically, angles up to 22° from the normal for sources and receivers can be used in the gathered traces to ensure that the second assumption is accurate. With these simplifying assumptions the Zoeppritz power series equation can be expanded, with the second order of terms dropped, yielding the following simplification:

$$R_p(\theta) \sim P + Q \sin^2 \theta \tag{1}$$

$$P = R_{po} \tag{2}$$

$$Q = R_{po} - 8T^2 R_{so} + (2T^2 - \tfrac{1}{2}) \Delta\rho/\rho \tag{3}$$

where $\Delta\rho = \rho - \rho'$, $\theta$ is the angle from the normal of the wave path between a source-receiver pair; and, $$T = \text{Average of } V_s/V_p \tag{4}$$

$R_{po}$ is the normal incident P wave reflection coefficient; and $R_{so}$ is the normal incident S wave reflection coefficient ($R_{po}$ and $R_{so}$ are the coefficients which exists for P and S waves propagated normal to a reflection boundary).

For the first order factors discussed above, e.g., travel path factors, geometric characteristics random variations, etc., which have not been removed from the gathered signals by appropriate selection of shooting conditions and preprocessing and which still affect the amplitude variation with offset $A_p(x)$, each can be rCepresented by a function $$F_i \sim 1 + g_i \sin^2 \theta \tag{5}$$

where $i=1$ to the number of influencing factors N.

Thus, the total of all remaining influencing effects can then be represented as:

$$A_p(\theta) \approx (F_1 \cdot F_2 \ldots \cdot F_n) R_p(\theta) \tag{6}$$

The value $A_p(\theta)$ can also be represented by a general equation of the form:

$$A_p(\theta) = P + Q \sin^2(\theta) \tag{7}$$

with $$P = R_{po} \tag{8}$$

and $$Q = GR_{po} - 8T^2 R_{so} + (2T^2 - \tfrac{1}{2}) \Delta\rho/\rho \tag{9}$$

where $$G = 1 + \sum_i^N g_i \tag{10}$$

Equation (10) represents the totality of amplitude effects in the gathered traces caused by the various influencing factors discussed above, e.g., travel path factors, geometric characteristics, random variations, etc., which have not been removed from the gathered traces by shooting conditions or preprocessing.

For recorded traces at known offsets, equation (7) can be rewritten as:

$$A_p(x) \sim P + Q \, fx^2 \tag{11}$$

where x represents known offset values determined by the spatial positioning of sources and receivers in the array (FIG. 1), $A_p(x)$ is a measured amplitude value for a determined offset x, and f represents a conversion factor for offset incident angle derived from MNO corrections $$f = (V_{INT}/tV_{st}) \tag{12}$$

where $V_{INT}$ is an estimated interval velocity (P wave velocity through a medium of interest) and $V_{st}$ is an estimated stacking velocity (effective velocity used to line up traces in a stack), and t is a two-way travel time.

Equation (11) can be solved for P and Q at each selected time point using, for example, an iterative least mean squared procedure to find the best "fit" of P and Q values. From calculated P and Q values, equation (8) can be solved to yield $R_{po}$ values. Moreover, the determined value of Q can be used in equation (9) to determine $R_{so}$ (the normal shear wave reflection coefficient) if the values of T, G and $\Delta\rho/\rho$ are known. The relationship of the value T (equation 4) to Q can be illustrated as follows:

| T = $\overline{V_p/V_s}$ | Q |
|---|---|
| 1.4 | $GR_{po} - 4 R_{so} + \tfrac{1}{2} \Delta\rho/\rho$ |
| 2.0 | $GR_{po} - 2 R_{so}$ |
| 4.0 | $GR_{po} - \tfrac{1}{2} R_{so} - \tfrac{3}{8} \Delta\rho/\rho$ |

As demonstrated, if $T = \overline{V_p/V_s} = 2.0$, then the term $\Delta\rho/\rho$ is eliminated as a factor in the calculation of Q. In many instances, the value of T will indeed be 2.0. However, it is also now possible to obtain direct measurements of $V_p/V_s$ using compressional and shear wave borehole logs, enabling the value $R_{so}$ to be determined from determined values of T, Q, and $R_{po}$, if $\Delta\rho/\rho$ and G can also be determined.

The value $\Delta\rho/\rho$ can often be predicted with reasonable accuracy from known subsurface characteristics. Typically, $\Delta\rho/\rho \sim 1/n\ R_{po}$, where n is an observed value for a particular area and is typically 5. It is also possible to obtain $\Delta\rho/\rho$ directly as a measured value from actual well logs of a surveyed area ($\Delta\rho/\rho = \Delta V_p/V_p$).

The value of G can be estimated, as it typically has the value $G \sim 0$ when land vibrator velocity geophones are used in the source-receiver array. It also typically has the value $G \sim 1$ for marine explosive and hydrophone sources and hydrophone receivers. However, it is also possible to more accurately estimate the value of G. A description of a technique for doing this is as follows:

Recalling equations 8 and 9, $$P = R_{po} \qquad (8)$$

$$Q = GR_{po} - 8T^2 R_{so} + (2T^2 - \tfrac{1}{2})\Delta\rho/\rho \qquad (9)$$

P and Q are estimated using, for example, a least mean squared technique, for each time point in the CDP trace gather. The density term $\Delta\rho/\rho$ in equation 9 can be removed by assuming $\Delta\rho/\rho 1/n(R_{po})$. Equation 9 then reduces to:

$$Q = G + \frac{(2T^2 - 1/2)}{nR_{po}} 8T^2 R_{so} \qquad (13)$$

In simplifying the Zeoppritz equation initially, it was assumed that T and G are slowly varying functions of time (and, of course, depth). Accordingly, a smoothing or low-pass filtered version of their constituent parts is all that is needed to estimate their values. This can be obtained from P wave and S wave log data from boreholes in the near vicinity. Thus, if P and S wave velocities ($V_p'$, $V_s'$) are taken from corresponding logs, the function T can be estimated as $$T \approx \left< \frac{V_s'}{V_p'} \right> \qquad (14)$$

where $<>$ designates a low pass filtering operation. Next, if synthetic P and S wave reflectives $R_{po}$ and $R_{so}$ are derived from P and S wave logs, then combining equations 8 and 9 and low pass filtering provides the following estimate of the function G:

$$G \approx \left< \frac{PQ}{P^2} \right> + 8T^2 \frac{<R_{po}R_{so}>}{<R_{po}^2>} - \frac{(2T^2 - 1/2)}{n} \qquad (15)$$

Once the value of G is known, equation (9) can be solved for $R_{so}$.

$$R_{so} = (1/n(G + 2T^2 - \tfrac{1}{2})P - Q)/8T^2 \qquad (16)$$

Thus, by first solving equation (7) using a least mean squared procedure to determine P (where $P = R_{po}$) and Q and then solving equation (9) to determine $R_{so}$, both the compressional wave reflection coefficient $R_{po}$ and the shear wave reflection coefficient $R_{so}$ can be determined from measured amplitude variations with offset $A_p(x)$. These values can be used to construct both compressional wave and shear wave seismic sections for interpretation and analysis.

Figure 3:
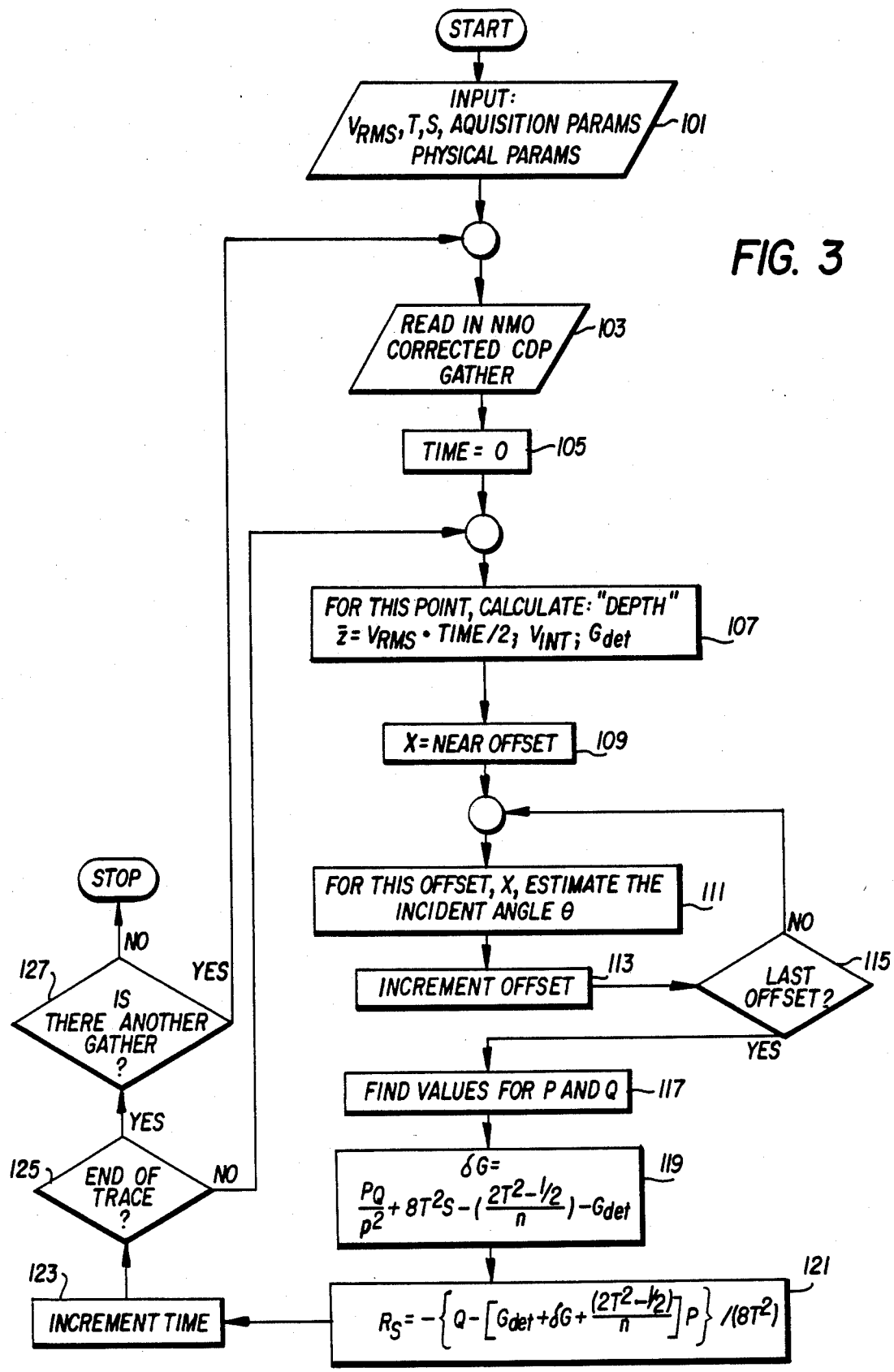
FIG. 3 illustrates in flow chart form a computer program implementing the method of the invention.

A representative computer program implementation of the method of the invention, which can be run on commercially available general purpose digital computers, is illustrated in FIG. 3.

In the first step 101, values for $V_{RMS}$, T, S and acquisition (shooting) and physical parameters are input to the computers, where $V_{RMS}$ represents stacking velocities ($V_{st}$), $$T = <V_s'/V_p'> \qquad (17)$$

which is a filtered (smoothed) version of $V_s/V_p$ data obtained from actual borehole logs, and $$S = \frac{<R_p' R_s'>}{<R_p'^2>} \qquad (18)$$

which is filtered (smoothed) statistical data also obtained from actual borehole logs. The acquisition parameters include types of sources and receivers used and array parameters. The physical parameters include an elastic attenuation parameter q. In the next step 103, NMO corrected CDP trace gathers are read into the computer (these traces are also preprocessed to correct for near surface statics, if required, e.g., for land shootings). In step 105, a time T=0 is set in a time counter. Following this, in step 107, for the time then set in the time counter, a "depth"=z is calculated as $$z = V_{RMS} \cdot \frac{\text{TIME}}{2} \qquad (19)$$

as is an estimated interval velocity $V_{INT}$, and a deterministic component $G_{det}$ of the influencing factors on amplitude versus offset behavior. For example, certain deterministic factors are governed by known equations. These include spherical spreading (SS), which is defined as $$SS = -(\tfrac{1}{2})V^{(3)}/V_{INT}^3, \qquad (20)$$

where $$V^{(3)} = \frac{1}{T} \int_0^T V_{INT}^3 \cdot t \, dt \qquad (21)$$

where t=a one-way travel time, source receiver directivity in arrays (SRD), which is defined as $$SRD = 1/6(\pi s l)^2 / V_{INT}^2 \qquad (22)$$

where s represents the frequency of the source signal and 1=array length; and attenuation (AT), which is defined as $$AT = -1/q(\pi s t/V_{INT}^2)V_{RMS} \qquad (23)$$

Using these equations, $G_{det}$ can be determined for these influencing factors. Thereafter, in step 109, a counter is set, with the near offset value x for the gathered trace having the smallest incident angle $\theta$ and in step 111, this incident angle $\theta$ is estimated using the equation $$\sin^2 \theta = \left( \frac{V_{INT}}{V_{RMS}} \cdot \frac{x^2}{x^2 + 4z^2} \right) \qquad (24)$$

In subsequent step 113, the offset counter x is incremented, with the next offset value x (the offset of the next trace in the gather moving toward the trace having the farthest offset), and in step 115, a determination is made of whether all offsets (all traces) have been processed. If not, the incident angle $\theta$ is estimated for the newest offset x incremented at step 113. When all offsets x have processed to estimate the corresponding incident angles $\theta$, the processing computer proceeds to step 117, where it calculates values for P and Q using Equation (7) and a least mean squared processing technique. Following this, the computer proceeds to step 119, where an estimate is made of the component of amplitude versus offset behavior which is not due to a shear wave velocity component and is not accounted for by the deterministic component $G_{det}$ calculated in step 107. This estimate G is made in accordance with the equation $$G \approx \frac{PQ}{P^2} + 8T^2S - \frac{(2T^2 - 1/2)}{n} - G_{det} \quad (25)$$

Following this, in step 121, a shear wave reflectivity component $R_s$ is calculated from the equation $$R_s = -\left( Q - \left[ G_{det} + \delta G + \frac{(2T^2 - 1/2)}{n} \right] P \right) / (8T^2) \quad (26)$$

which is a rewritten version of Equation (16). The computer then proceeds to step 123, where the TIME counter is incremented. In the next step 125, a determination is made of whether the end of the processed traces has been reached. If not, the computer proceeds back to step 107, with a new trace time value and repeats steps 107 . . . 123. If the end of the traces is reached, it is determined in step 125, following which the computer proceeds to step 127, where it determines if all NMO corrected gathers have been processed. If they have, the program ends; if not, the computer proceeds to step 103 and begins processing a new trace gather.

In step 121, the computer calculates shear wave reflectivity coefficients which can then be applied to the gathered traces to produce traces representing shear wave reflection traces. These shear wave traces can then be used in conventional manner (CDP stached) to produce pseudo-shear wave seismic sections.

While a preferred embodiment of the method of the invention has been described and illustrated, it should be apparent that modifications can be made thereto without departing from the spirit and scope of the invention. Accordingly, the invention is not limited by the foregoing description, but is only limited by the scope of the appended claims.

We claim:

1. A method of producing shear wave reflection information from compressional wave reflection information comprising the steps of:

(a) generating descending acoustic waves from a plurality of acoustic wave sources and receiving and recording at a plurality of receivers ascending waves produced at a subsurface interface;

(b) gathering said recorded reflection waves into sets of different source-receiver offsets having a common reflection boundary;

(c) correcting said gathered reflection waves for normal moveout;

(d) measuring amplitudes of said gathered waves at selected points in time for different source-receiver offset values;

(e) determining for each said point in time a component $g_{det}$ which represents the amplitude variations in the measured amplitudes of said gathered waves due to the effects of source-receiver offset;

(f) estimating for each said point in time a component of amplitude variation with offset $\delta G$ which is not due to a shear wave component and is not accounted for in $G_{det}$; and (g) determining for each said point in time a shear wave reflectivity component $R_3$ in accordance with the following:

$$R_s = -\left( Q - \left[ G_{det} + \delta G + \frac{(2T^2 - \frac{1}{2})}{n} \right] P \right) / (8T^2)$$

with $P = R_{po}$ and $Q = GR_{po} - 8T^2 R_{so} + (2T^2 - \frac{1}{2})\Delta\rho/\rho$, where, $R_{po}$ = normal incident compressional wave reflection coefficient $R_{so}$ = normal incident shear wave reflection coefficient $T$ = average $V_s/V_p$, $\rho$ = density $G$ = totality of amplitude effects caused by said variations in the amplitude of the acoustic waves with offset, so that the influence of said amplitude effects on said measured acoustic waves are removed in determining shear wave reflection information.

2. The method of claim 1, wherein the value $\delta G$ is determined in accordance with the relationship $$\delta G \approx \frac{<PQ>}{<P^2>} + 8T^2S - \frac{(2T^2 - 1/2)}{n} - G_{det}$$

where $<PQ>$ represents filtered values of PQ, $<P^2>$ represents a filtered value of $P^2$, and S represents the filtered value $<R_p'R_s'>/<R_p'^2>$.

* * * * *

UNITED STATES PATENT AND TRADEMARK OFFICE
CERTIFICATE OF CORRECTION

PATENT NO. : 4,736,349
DATED : April 5, 1988
INVENTOR(S) : Neal R. Goins et al

It is certified that error appears in the above-identified patent and that said Letters Patent is hereby corrected as shown below:

Column 3, line 56, "rCepresented" should read --represented--.

Column 5, line 19, "$\Delta p/p 1/n(Rpo)$" should read -- $\Delta p/p \sim 1/n(R_{po})$ --

Column 5, line 46, the middle equation:

$$\frac{<R_{po} R_{so}>}{<R^2_{po}>} \quad \text{should read:}$$

$$-- \frac{<R_{po} R_{so}>}{<R_{po}^2>} --.$$

Column 6, line 40, $V^{(3)} = \frac{1}{T}\int_0^T V^3_{INT} \cdot t\, dt$ should read:

$$-- V^{(3)} = \frac{1}{T}\int_0^T V_{INT}^3 \cdot t\, dt --.$$

Column 8, line 21, "$R_3$" should read --$R_s$--.

Signed and Sealed this

Third Day of October, 1989

Attest:

DONALD J. QUIGG

Attesting Officer     Commissioner of Patents and Trademarks